United States Patent [19]

Nakanishi

[11] Patent Number: 4,944,805

[45] Date of Patent: Jul. 31, 1990

[54] METHOD OF HEAT TREATMENT AMORPHOUS SOFT MAGNETIC FILM LAYERS TO REDUCE MAGNETIC ANISOTROPY

[75] Inventor: Kanji Nakanishi, Kanagawa, Japan

[73] Assignee: Fuji Photo Film Co., Ltd., Kanagawa, Japan

[21] Appl. No.: 243,533

[22] Filed: Sep. 12, 1988

[30] Foreign Application Priority Data

Sep. 10, 1987 [JP] Japan ............................. 62-225167
Sep. 10, 1987 [JP] Japan ............................. 62-225168

[51] Int. Cl.$^5$ .............................................. C21D 1/04
[52] U.S. Cl. ................................. 148/108; 148/304; 204/192.2; 427/130
[58] Field of Search ............... 148/108, 304; 427/130; 204/192.2

[56] References Cited

FOREIGN PATENT DOCUMENTS

| 200748 | 11/1984 | Japan | 148/108 |
| 1127103 | 6/1986 | Japan | 148/108 |
| 192161 | 8/1986 | Japan | 148/304 |

Primary Examiner—Melvyn J. Andrews

Attorney, Agent, or Firm—Sughrue, Mion, Zinn, Macpeak & Seas

[57] ABSTRACT

A method of heat treating an amorphous soft magnetic (ASM) film for use in a device that utilizes magnetism and is fabricated by depositing two or more layers of an ASM film, and an associated oxide film and conductive metal film, on a substrate. Typically, the substrate is made of an oxide. More specifically, the method involves: performing a heat treatment after each layer of the ASM film has been deposited, at a temperature lower than the crystallization temperature and the Curie point of the ASM film in a static magnetic filed applied either in a direction generally perpendicular to the direction in which a high magnetic permeability for high frequency is to be finally attained in the ASM film or in the principal direction in which the high permeability for high frequency is desired; performing a heat final treatment, after all of the layers of the ASM film have been deposited, at a temperature equal to or lower than the temperature for the previous heat treatment in a static magnetic field applied either in the principal direction or in a direction generally perpendicular thereto, the magnitude of the uniaxial magnetic anisotropy to be imparted to the ASM film being controlled by the temperature and duration of the final heat treatment.

18 Claims, 6 Drawing Sheets

1

METHOD OF HEAT TREATMENT AMORPHOUS SOFT MAGNETIC FILM LAYERS TO REDUCE MAGNETIC ANISOTROPY

BACKGROUND OF THE INVENTION

The present invention relates to a method of heat treating a layered amorphous soft magnetic (ASM) film with two or more layers. More particularly, the present invention relates to a method of heat treating an ASM film in such a way that it will provide a sufficiently high permeability over a broad range of frequencies to make it suitable for use in various components that utilize magnetism such as magnetic cores in thin-film heads.

Metals in their solid state normally occur in a crystalline form in which the atoms arrange themselves in an ordered, repeating, three-dimensional pattern. However, if solutions of certain alloys are rapidly quenched from their molten state to solidify them or if certain target materials are ion-sputtered and the scattered atoms deposited on a rapidly chilled substrate, ASM materials can be produced that are solid yet have an atomic arrangement similar to that occurring in the liquid state. Such ASM materials, which are well known in the art, do not have the long-range order of the crystal structure that is present in crystalline materials. Rather. ASM materials have a random atomic arrangement which makes them inherently free from the magnetocrystalline anisotropy of crystalline materials.

However, ASM materials are prone to magnetic anisotropy that is frequently induced during their manufacture. The induced magnetic anisotropy has an uneven distribution of magnitude and direction and the magnetic characteristics of such newly prepared materials are generally poor. In addition, the ASM materials having induced magnetic anisotropy are thermally labile. Another problem associated with ASM materials is that the various process-dependent strains that develop in them during the creation of an amorphous state will remain in the bulk of the material and this will not only impair its magnetic characteristics but also make it thermally unstable. If a heat treatment is conducted after molding as in the case of manufacturing a magnetic head in which the pole material is molded in glass or some other material, the internal strain can be eliminated. However, stress will develop at the interface between the pole material and the glass. The magnetic characteristics of the pole material will thus be impaired rather than improved.

In order to remove the induced magnetic anisotropy and internal strain that have developed during the manufacture of ASM materials, various heat treatments have been proposed. Among these proposals is a method which consists of heat treating an ASM material in a rotating magnetic field in a non-oxidizing atmosphere at a temperature below the Curie point and the crystallization temperature. This method is an effective approach and is capable of improving the permeability of the material in a dc electric field or in a low-frequency range. However, if the induced magnetic anisotropy is eliminated or reduced, the domain structure of the material becomes so unstable and coarse that the domain walls tend to move easily and the permeability of the material in the high-frequency range ($\geq 1$ MHz) is decreased.

To improve the permeability in the high-frequency range, the magnetization process must rely on the rotation of magnetization which provides a higher switching speed, rather than on the movement of domain walls. To this end, the magnetization must be driven from the axis, i.e., direction of relatively high permeability, into the directions of relatively low permeability by imparting an appropriate magnitude of uniaxial anisotropy to the magnetic material. It is also necessary to remove the residual internal strain from the magnetic material before it is covered with a dissimilar material such as glass so as to ensure the eventual removal of all strain from the bulk of the magnetic material.

SUMMARY OF THE INVENTION

Accordingly, it is an object of the present invention to provide a method of heat treating an amorphous soft magnetic (ASM) material in such a way as to improve its high-frequency characteristics. The present invention is based on the discovery that in order to improve the characteristics of an ASM material that is to be used in the high-frequency range i.e., $\geq 1$ MHz, magnetic anisotropy and internal strain induced during the manufacturing process must be removed. The invention is also based on the further discovery that uniaxial magnetic anisotropy of an appropriate magnitude depending on the specific purpose must be imparted in a certain direction.

The above-stated objects of the present invention can generally be attained by a method of heat treating an ASM film for use in a device that utilizes magnetism and which is fabricated after depositing two or more layers of an ASM film, and an associated oxide film and conductive metal film, on a substrate. Typically, the substrate is made of an oxide. More specifically, the method comprises: performing a heat treatment after each layer of the ASM film has been deposited, at a temperature lower than the crystallization temperature and the Curie point of the ASM film in a static magnetic field applied either in a direction generally perpendicular to the direction in which a high magnetic permeability for high frequency is to be finally attained in the ASM film or in the principal direction in which the high permeability for high frequency is desired (to be finally attained); performing a final heat treatment, after all of the layers of the ASM film have been deposited, at a temperature equal to or lower than the temperature for the previous heat treatment in a static magnetic field applied either in the principal direction in which the high permeability for high frequency is desired in the ASM film or in a direction generally perpendicular to the principal direction. The magnitude of the uniaxial magnetic anisotropy to be imparted to the ASM film is controlled by the temperature and duration of the final heat treatment.

The thus heat-treated ASM film is substantially free from internal strain that might otherwise remain. In addition, uniaxial magnetic anisotropy is imparted, with a magnitude controlled in accordance with one's specific objective. Therefore, this ASM film has a high permeability over a broad range of frequencies and is suitable for use in devices that utilize magnetism such as a magnetic core in a thin-film head.

In accordance with the method of the present invention, after each layer of the ASM film is deposited, the assembly is heat treated in a static magnetic field so as to remove any internal strain and to impart a great amount of uniaxial magnetic anisotropy. An advantage of this technique is that the imparted uniaxial magnetic anisotropy will not be disturbed by weak stray magnetic fields or heat to which the ASM film might be exposed before it is subjected to the final heat treatment. As a result, the treated ASM film will have consistent magnetic characteristics.

DETAILED DESCRIPTION OF THE INVENTION

Figure 1A:
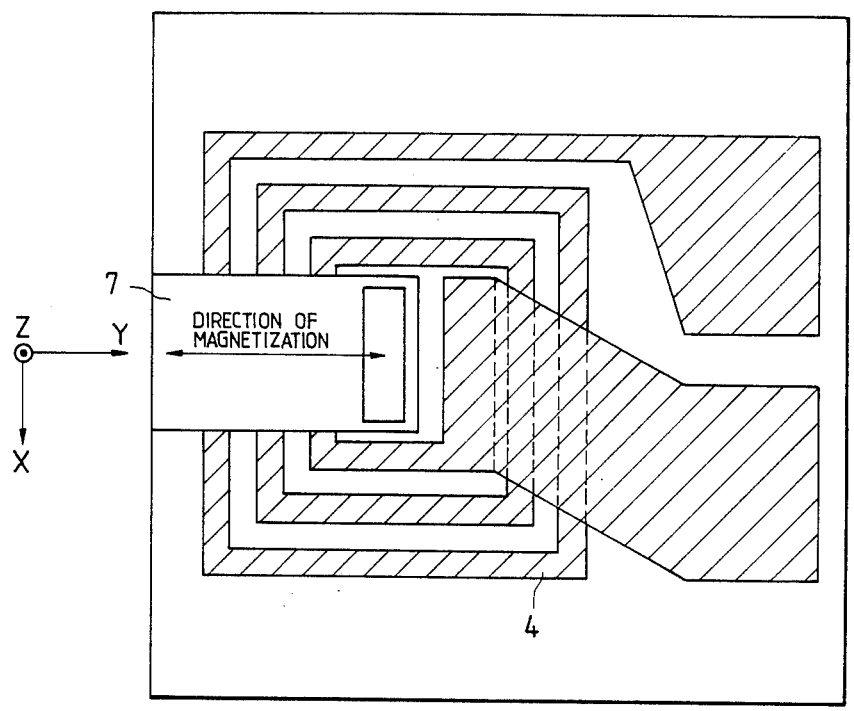
FIG. 1A is a plan view of a magnetic core for a thin-film head that uses an amorphous soft magnetic (ASM) film that has been heat-treated by the method of the present invention.
Figure 1B:
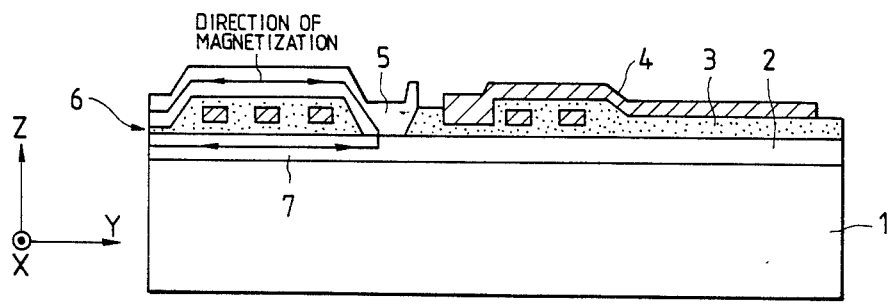
FIG. 1B is a vertical section of the magnetic core shown in FIG. 1A.

A first embodiment of the present invention is described hereunder with reference to fabrication of a thin-film magnetic head. FIGS. 1A and 1B show schematically the configuration of the thin-film magnetic head after fabrication. When a current is applied to a coil conductor 4, a magnetic flux flows in the direction indicated by arrows in FIG. 1B. The flux leaks from a magnetic gap portion 6 and exists from a magnetic core 7 for recording information on a magnetic recording medium. In the process of reproducing the stored information, the magnetic flux leaking from the recording medium is guided into the core 7 through the gap portion 6. The flux flows in the Y-direction (indicated by arrows A) and induces a voltage in the windings of the coil conductor 4 which interlinks the flux. To record and reproduce using the thin-film head shown in FIGS. 1A and 1B. it is necessary to increase the permeability in the direction of magnetization indicated by the arrows A (i.e.. principally in the Y-direction) over a wide range of frequencies.

In the head shown in FIGS. 1A and 1B, the magnetic core 7 is formed of a two-layered amorphous soft magnetic (ASM) film consisting of a lower pole layer 2 in contact with a substrate 1 and an upper pole layer 5, and a coil conductor 4 interposed between the two layers.

The thin-film magnetic head according to the first embodiment is fabricated by the following procedure. First, a substrate is prepared by grinding and polishing an alumina plate. Second, using a sputtering technique, an ASM film 10 $\mu$m thick, which film consists of 91.8 at% Co, 2.3 at% Zr and 5.9 at% Nb, is formed over the entire surface of the substrate to provide the lower pole layer. The lower pole layer has a saturation flux density Bs of 10.5 kG, a saturation magnetostriction $\lambda$s of approximately $+3 \times 10^{-7}$ and a crystallization temperature Tx of 480° C.

Figure 2:
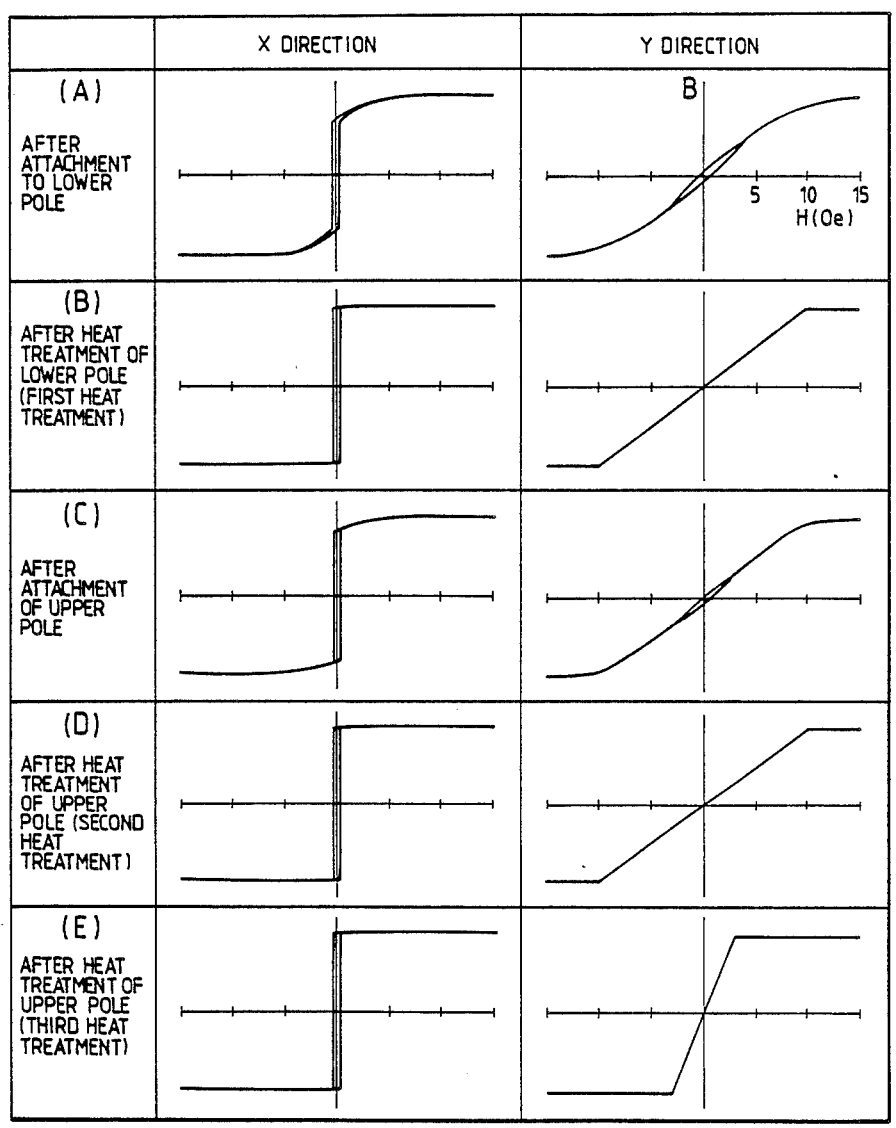
FIG. 2 is a graph showing changes in the magnetic characteristics of an ASM film that is heat-treated in accordance with a first embodiment of the present invention in which the magnetic film is provided for fabricating a magnetic core for a thin-film head.

Third, a uniform magnetic field of 1 kOe is applied to the combination of the substrate and the lower pole layer in a direction generally perpendicular to the direction in which a high permeability at high frequency is desired, namely, in the direction that corresponds to the X-direction in the finished head pattern of FIGS. 1A and 1B. While the magnetic field is applied, the sample is subjected to a first heat treatment at 350° C. for 30 minutes in a vacuum ($10^{-3}$ to $10^{-5}$ Torr) and subsequently cooled to room temperature. The B-H curves of the magnetic film before and after the first heat treatment are shown in FIG. 2 in rows (A) and (B), respectively. As can be observed from row (A), before the first heat treatment, the magnetic anisotropy induced in the magnetic film lacks sharpness. However, after the first heat treatment, the same magnetic film shows sharp uniaxial magnetic anisotropy with the easily permeable axis being in the X-direction (row (B)). The anisotropy imparted by the first heat treatment occurs in a direction (X-direction) generally perpendicular to the direction in which high permeability is to be finally attained and the strength of the anisotropy field is 10.0 Oe. Through experimentation, the present inventors have discovered that upward convex warpage which had occurred in the substrate during film deposition was substantially eliminated as a result of the first heat treatment, thus indicating removal of compressive stress from the film.

After the first heat treatment, a $SiO_2$ film serving as an insulator and a Cu film serving as a coil conductor are deposited on the lower pole layer by sputtering and the deposited films are patterned. By repeating this step, a coil pattern that interlinks the magnetic core, the magnetic gap, rear contacts of the magnetic core and so forth is formed. The patterning process consists of photoresist pattern formation using photolithography and dry etching by exposure to an ion beam.

After forming the magnetic gap and the rear contacts of the magnetic core, another ASM film having the same composition as that of the lower pole layer is deposited to form an upper pole layer having a film thickness of 10 $\mu$m. At this stage, the sample does not show any sharp uniaxial anisotropy as is apparent from the B-H curves shown in row (C) of FIG. 2. However, the resulting B-H characteristics are similar to those obtained by superposing the characteristics shown in rows (B) and (A), which indicates that the sample retains the characteristics of the heat-treated lower pole layer even after the upper pole layer (with characteristics similar to those shown in row (A)) has been deposited. After the deposition of the upper pole layer, a uniform magnetic field of 1 kOe is applied to the assembly in the X-direction as in the first heat treatment and the assembly is subjected to a second heat treatment at 350° C. for 30 minutes in a vacuum ($10^{-3}$ to $10^{-5}$ Torr). Subsequently, the assembly is cooled to room temperature. The characteristics of the so treated assembly are shown by B-H curves in row (D) of FIG. 2, which curves appear identical to the curves shown in row (B). At the same time, the present inventors have also discovered through experimentation that the upward convex warpage which had occurred in the substrate during the deposition of the upper pole layer was substantially eliminated as a result of the second heat treatment, which indicates that compressive stress in the upper pole layer as well as tensile stress in the lower pole layer was removed.

After measurement of the magnetic properties and warpage, a uniform magnetic field of 1 kOe is applied to the assembly in the Y-direction and the assembly is subjected to a third heat treatment at 300° C. for 200 minutes in a vacuum ($10^{-3}$ to $10^{-5}$ Torr). Subsequently, the assembly is cooled to room temperature. The B-H characteristics of the combination of the upper and lower pole layers after the third heat treatment are shown in row (E) of FIG. 2. As a result of the first and second heat treatments, uniaxial magnetic anisotropy having an anisotropy field of 10.0 Oe is imparted to each of the upper and lower pole layers in the X-direction. If these films are subjected to the third heat treatment at 300° C. for 200 minutes in a static magnetic field applied in the Y-direction, they retain the uniaxial magnetic anisotropy with the relatively easily permeable axis being in the X-direction but with its anisotropy field being reduced to about 3 Oe.

After the third heat treatment, the upper pole layer is patterned, a protective layer is deposited thereon and a protective plate is joined thereto. The assembly is finally machined to a predetermined shape, thereby producing a complete magnetic head.

As described above, in accordance with the heat treating method of the present invention, any strain that might develop in ASM films is eliminated after each of the films is deposited; this is effective in preventing the deterioration of magnetic characteristics due to residual strain. In addition, the whole fabrication process can be performed with high and sharp uniaxial magnetic anisotropy being imparted, so the magnetic characteristics will not be readily disturbed during the process. In addition, the magnitude of the uniaxial magnetic anisotropy of each ASM layer can be made uniform to ensure precise control of the magnetic anisotropy can.

The magnitude of the uniaxial magnetic anisotropy to be finally attained can vary with the temperature for each of the first and second heat treatments to be applied after each film deposition but this can generally be controlled by the temperature and duration of the final heat treatment.

Figure 3:
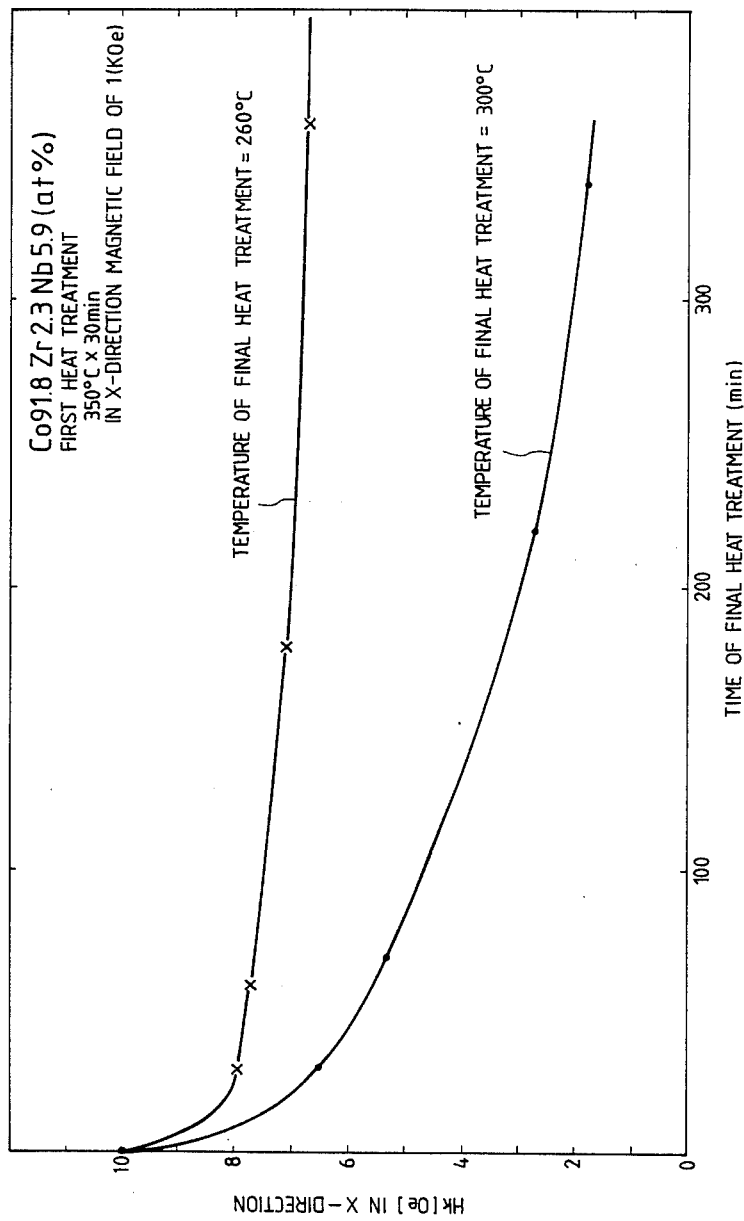
FIG. 3 is a graph showing the anisotropy field Hk vs. the duration of a final heat treatment conducted at selected temperatures on a 91.8 at% Co. 2.3 at% Zr. 5.9 at% Nb ASM film according to the first embodiment.

FIG. 3 is a graph showing the magnitude of the uniaxial magnetic anisotropy finally attained as a function of the duration of the final heat treatment conducted on a 91.8 at% Co. 2.3 at% Zr. 5.9 at% Nb ASM file according to the first embodiment, for selected temperatures for the final heat treatment. In FIG. 3, the first and second heat treatments were conducted at 350° C. Similar relationships can be established not only for CoZrNb based ASM films with other compositions but also for ASM films made of other, alloying elements. The anisotropy field Hk can be controlled by selecting the appropriate temperature and duration of heat treatment to suit the specific material used.

The uniaxial anisotropy field Hk of the magnetic core material is preferably as small as possible subject to the condition that its domain walls should not become unstable. Depending on the core dimensions, the preferred value of the anisotropy field varies from approximately 2 to 6 Oe. The data in FIG. 3 shows that the desired uniaxial anisotropy field can be attained by performing the final heat treatment at 300° C. for 45 to 300 minutes.

A second embodiment of the present invention is described hereinafter with reference to fabrication of a thin-film magnetic head. The fabricated thin-film magnetic head has the same configuration as that depicted in FIGS. 1A and 1B. The second embodiment is essentially the same as the first embodiment except for the direction of the magnetic fields applied to the sample during successive heat treatments.

The thin-film magnetic head according to the second embodiment is fabricated by the following process. First, a substrate is prepared by grinding and polishing an alumina plate. Second, using a sputtering technique, an ASM film 10 $\mu$m thick which consists of 91.8 at% Co. 2.3 at% Zr and 5.9 at% Nb is formed over the entire surface of the substrate to provide a lower pole layer. This layer has a saturation flux density of 10.5 kG, a saturation magnetostriction $\lambda$s of approximately $+3 \times 10^{-7}$ and a crystallization temperature Tx of 480° C.

Figure 4:
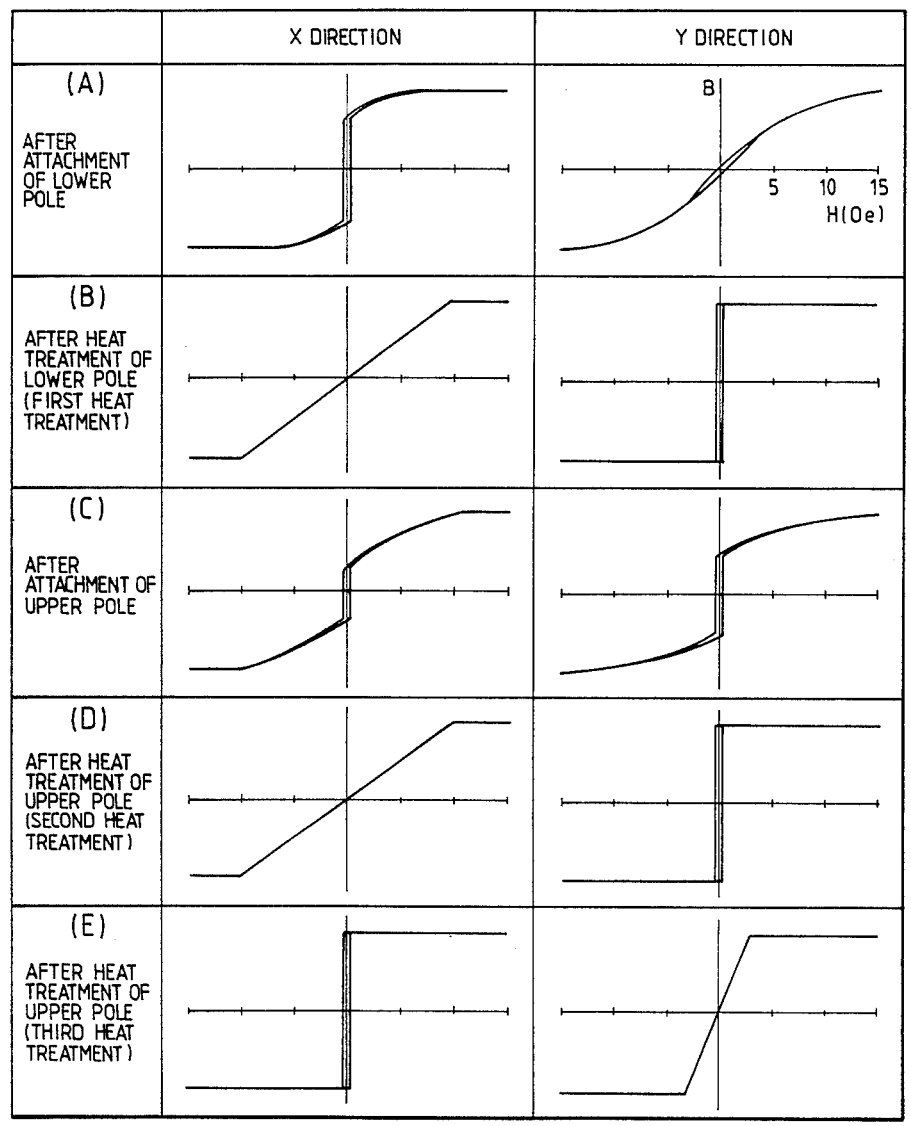
FIG. 4 is a graph showing changes in the magnetic characteristics of an ASM film that is heat-treated in accordance with a second embodiment of the present invention in which the magnetic film is provided for fabricating a magnetic core for a thin-film head.

Next, a uniform magnetic field of 1 kOe is applied to the substrate and lower pole layer assembly in the direction in which a high permeability for high frequency is desired, namely, in the direction that corresponds to the Y-direction of a finished head pattern. With this magnetic field applied, the sample is subjected to a first heat treatment at 350° C. for 30 minutes in a vacuum ($10^{-3}$ to $10^{-5}$ Torr) Subsequently, the sample is cooled to room temperature. The B-H curves of the magnetic film before and after the first heat treatment are shown in rows (A) and (B) of FIG. 4, respectively. Before the first heat treatment, the magnetic anisotropy induced in this magnetic film lacks sharpness (see row (A)). but after the first heat treatment, the same magnetic film shows sharp uniaxial magnetic anisotropy with the easily permeable axis being in the Y-direction (see row (B)). The anisotropy imparted by the first heat treatment occurs in the direction (Y-direction) in which high permeability is desired and the strength of the anisotropy field is 10.0 Oe. As in the first embodiment, the first heat treatment substantially eliminated upward convex warpage which had occurred in the substrate during film deposition, indicating the removal of compressive stress from the film.

After the first heat treatment, a $SiO_2$ film serving as an insulator and a Cu film serving as a coil conductor are deposited on the lower pole layer by sputtering and the deposited films are patterned. By repeating this step, a coil pattern that interlinks the magnetic core, the magnetic gap, rear contacts of the magnetic core and so forth is formed. The patterning process consists of photoresist pattern formation using photolithography and dry etching by exposure to an ion beam.

After forming the magnetic gap and the rear contacts of the magnetic core, an ASM film having the same composition as that of the lower pole layer is deposited to form an upper pole layer having a film thickness of 10 $\mu$m. At this stage, the sample does not show any sharp uniaxial anisotropy as is apparent from the B-H curves given in row (C) of FIG. 4. However, the resulting B-H characteristics are similar to those obtained by superposing the characteristics shown in rows (B) and (A). indicating that the sample retains the characteristics of the heat-treated lower pole layer even after the upper pole layer (having characteristics similar to those shown in curve (A)) has been deposited.

After the deposition of the upper pole layer, a uniform magnetic field of 1 kOe is applied to the assembly in the Y-direction as in the first heat treatment and the assembly is subjected to the second heat treatment at 350° C. for 30 minutes in a vacuum ($10^{-3}$ to $10^{-5}$ Torr). Subsequently, the assembly is cooled to room temperature. The characteristics of the so treated assembly are shown by B-H curves in row (D) of FIG. 4, which curves appear identical to the curves shown in row (B). At the same time, the present inventors have discovered through experimentation that the upward convex warpage which had occurred in the substrate during the deposition of the upper pole layer was substantially eliminated as a result of the second heat treatment, indicating that compressive stress in the upper pole layer and tensile stress in the lower pole layer was removed.

After the measurements of the magnetic properties and warpage, a uniform magnetic field of 1 kOe is applied to the assembly in the X-direction and the assembly is subjected to the third heat treatment at 350° C. for 30 minutes in a vacuum ($10^{-3}$ to $10^{-5}$ Torr) Subsequently, the assembly is cooled to room temperature. The B-H characteristics of the combination of the upper and lower pole layers after the third heat treatment are shown in row (E) of FIG. 4. As a result of the first and second heat treatments, uniaxial magnetic anisotropy having an anisotropy field of 10.0 Oe is imparted to each of the upper and lower pole layers in the Y-direction. If these films are subjected to the third heat treatment at 350° C. for 30 minutes in a magnetic field applied in the X-direction, they retain the uniaxial magnetic anisotropy but the easily permeable axis is in the X-direction at a rotation of 90 degrees from the Y-direction, and the anisotropy field is reduced to about 3 Oe.

After the third heat treatment, the upper pole layer is patterned, a protective layer is deposited thereon and a protective plate is joined thereto. The assembly is finally machined to a predetermined shape, thereby producing a complete magnetic head.

As described above, in accordance with the heat treating method of the present invention, any strain that might develop in ASM films is eliminated after each of the films is deposited and this is effective in preventing the deterioration of magnetic characteristics due to residual strain. In addition, the whole fabrication process can be performed with high and sharp uniaxial magnetic anisotropy being imparted, so the magnetic characteristics will be readily disturbed during the process. The magnitude of the uniaxial magnetic anisotropy of each ASM layer is thus made uniform so as to ensure that precise control of the magnetic anisotropy in the completed structure can be achieved.

The magnitude of the uniaxial magnetic anisotropy finally attained can vary with the temperature for each of the first and second heat treatments to be applied after each film deposition step but this variance can generally be controlled by the temperature and duration of the final heat treatment.

Figure 5:
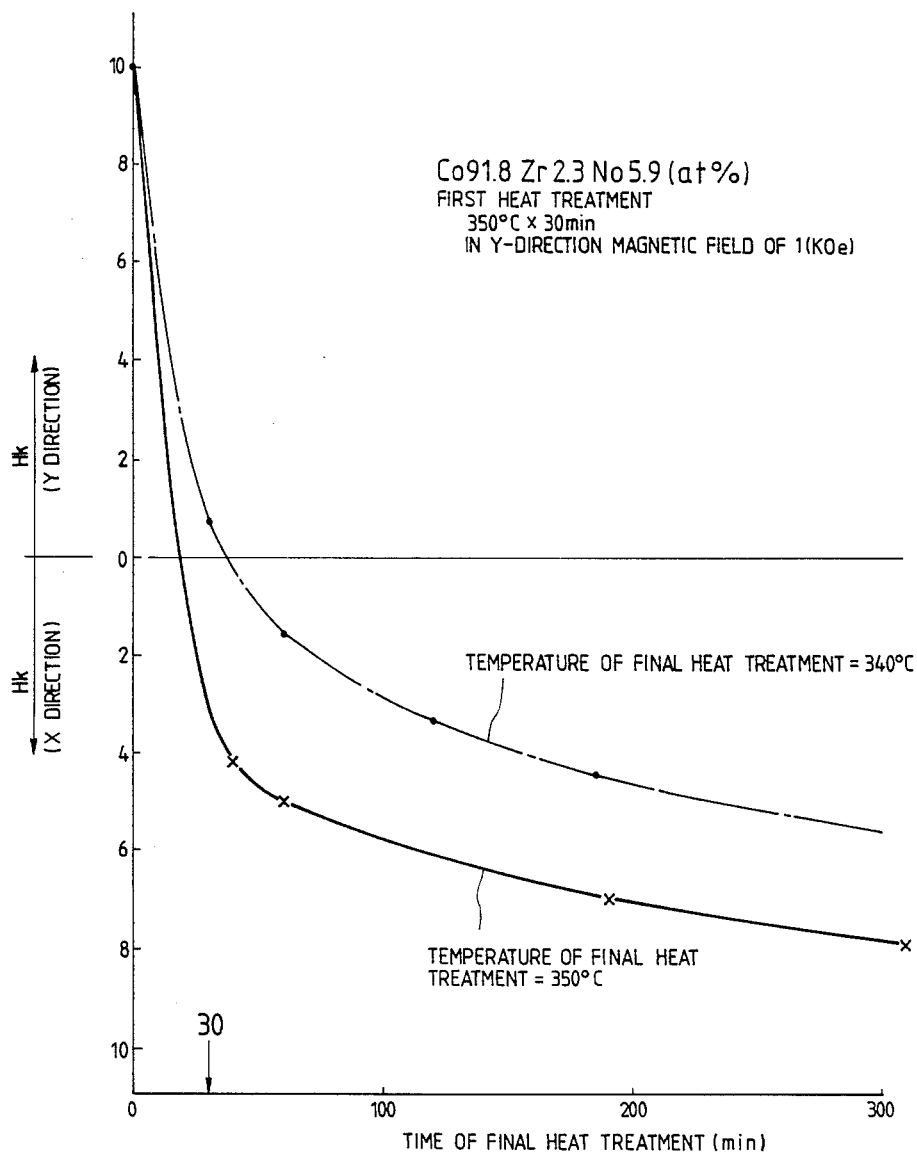
FIG. 5 is a graph showing the anisotropy field Hk vs. the duration of the final heat treatment conducted at selected temperatures on a 91.8 at% Co, 2.3 at% Zr, 5.9 at% Nb ASM film according to the second embodiment.

FIG. 5 is a graph showing the magnitude of the uniaxial magnetic anisotropy finally attained as a function of the duration of the final treatment conducted on a 91.8 at% Co. 2.3 at% Zr, 5.9 at% Nb ASM film in the second embodiment, at selected temperatures for the final heat treatment. The first and second heat treatments were conducted at 350° C. Similar relationships can be established not only for CoZrNb based ASM films but also for ASM films made of other alloying elements. The anisotropy field Hk can be controlled by selecting the appropriate temperature and duration of heat treatment to suit the specific material used.

The magnetic core material to be used preferably has the smallest possible value of uniaxial anisotropy field Hk subject to the condition that its domain walls should not become unstable. Depending on the core dimensions, the preferred value of the anisotropy field varies from approximately 2 to 6 Oe. The data in FIG. 5 shows that the desired uniaxial anisotropy field can be attained by performing the final heat treatment at 350° C. for 25 to 110 minutes.

In the first and second embodiments described above, the assembly that has been subjected to the second heat treatment is given the third and final heat treatment after it is cooled to room temperature. In practice, however, the third heat treatment may be continuous with the second heat treatment and equal results can be attained by performing both heat treatments at the same temperature with only the applied static magnetic field direction being changed. The heat treatments may be performed in a non-oxidizing atmosphere rather than in a vacuum.

Figure 6:
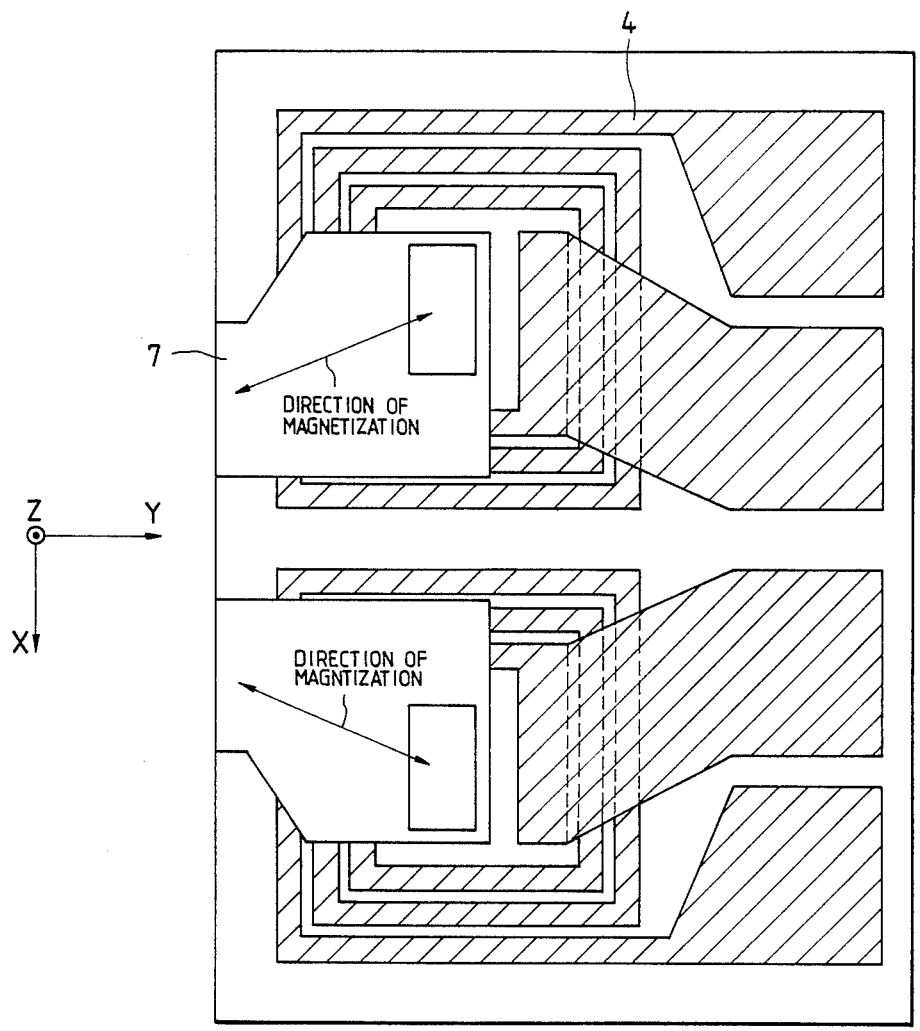
FIG. 6 is a plan view of a magnetic core for a two-channel thin-film head that uses an ASM film that has been heat-treated by the method of the present invention in accordance with either the first or second embodiment.

In the first and second embodiments, the difficult axes of the magnetic films are oriented substantially parallel to the direction of the magnetic path in which a high permeability for high frequency is to be attained. However, depending on the magnetic head structure, this ideal condition is not always met and the axes which are less permeable relative to the most permeable axis of the magnetic films may be at an angle to the direction in which a high permeability for high frequency is desired. An example of this practical case is shown in FIG. 6 with reference to magnetic heads of two adjacent channels that provide non-parallel magnetic paths. In this case, heat treatments may be performed in such a way that the difficult axes of the magnetic films to be finally attained will be in the direction (Y-direction) which is as close to parallel as possible relative to the magnetic paths of the two channels and which is inclined at the same angle with respect to the direction B, C of the magnetic path of the head on either channel.

As described on the foregoing pages, in accordance with the heat treating method of the present invention, any strain that might develop in ASM films is eliminated after each of the films is deposited to prevent deterioration of magnetic characteristics due to residual strain. In addition, the whole fabrication process can be performed with high and shaper uniaxial magnetic anisotropy being imparted, so that the magnetic characteristics will not be readily disturbed during the process. The magnitude of the uniaxial magnetic anisotropy of each ASM layer can be made uniform to ensure that the dispersion of anisotropy is reduced and that precise control of the magnetic anisotropy can be achieved. In addition, by properly selecting the temperature and duration of the final heat treatment, the anisotropy field can be controlled to an appropriate magnitude for a particular object, which contributes to improved controllability and reproducibility of the anisotropy field.

What is claimed is:

1. In a method of heat treating an amorphous soft magnetic film fabricated by depositing various layers of material on a substrate including at least two layers of amorphous soft magnetic film, the improvement in combination therewith comprising the steps of:
   performing a heat treatment, after each layer of said amorphous soft magnetic film has been deposited, at a temperature lower than the crystallization temperature and the Curie point of said amorphous soft magnetic film, while applying a static magnetic field in a first direction generally perpendicular to a second direction in which a high permeability for high frequency is desired in said amorphous soft magnetic film of said fabricated device relative to the permeability for high frequency in said first direction;

performing a final heat treatment, after all of the layers of said amorphous soft magnetic film have been deposited, at a temperature equal to or lower than the temperature for the heat treatment previous to the final heat treatment, while applying a static magnetic field in said second direction, and controlling at least one of the temperature and duration of the final heat treatment so as to control the magnitude of a uniaxial magnetic anisotropy to be imparted to said amorphous soft magnetic film.

2. The improvement according to claim 1, wherein the static magnetic field applied during the heat treatments is greater than the diamagnetic field that develops in said amorphous soft magnetic film and has a sufficient strength to fully magnetize said amorphous soft magnetic film.

3. The improvement according to claim 1, wherein said amorphous soft magnetic film is prepared by a sputtering process.

4. The improvement according to claim 1, wherein said various layers of material include an oxide film and a conductive film deposited on each said amorphous soft magnetic film and said substrate is formed of an oxide.

5. The improvement according to claim 1, wherein said high frequency is greater than or equal to 1 MHz.

6. The improvement according to claim 1, wherein each said head treatment is applied in one of a non-oxidizing atmosphere and a vacuum.

7. The improvement according to claim 1, wherein the temperature of said final heat treatment is the same as the temperature of said previous heat treatment.

8. The improvement according to claim 1, wherein prior to said final heat treatment, a step of cooling to room temperature is performed.

9. The improvement according to claim 1, wherein said final heat treatment is performed immediately following said previous heat treatment.

10. In a method of heat treating an amorphous soft magnetic film fabricated by depositing various layers of material including at least two layers of an amorphous soft magnetic film on a substrate, the improvement in combination therewith comprising:

performing a heat treatment, after each layer of said amorphous soft magnetic film has been deposited, at a temperature lower than the crystallization temperature and the Curie point of said amorphous soft magnetic film, while applying a static magnetic field in a first direction in which a high permeability for high frequency is desired in said soft magnetic film of said fabricated device relative to the permeability for high frequency in said first direction;

performing a final heat treatment, after all of the layers of said amorphous soft magnetic film have been deposited, at a temperature equal to or lower than the temperature for the heat treatment previous to the final heat treatment, while applying a static magnetic field in a second direction generally perpendicular to said first direction, the magnitude of the uniaxial magnetic anisotropy to be imparted to said amorphous soft magnetic film being controlled by the temperature utilized in said final heat treatment and by the duration thereof.

11. The improvement according to claim 10, wherein said static magnetic field applied during said heat treatments is greater than the diamagnetic field that develops in said amorphous soft magnetic film and has a sufficient strength to fully magnetize said amorphous soft magnetic film.

12. The improvement according to claim 10, wherein said amorphous soft magnetic film is prepared by a sputtering process.

13. The improvement according to claim 10, wherein said various layers of material include an oxide film and a conductive film deposited on each said amorphous soft magnetic film and said substrate is formed of an oxide.

14. The improvement according to claim 10, wherein said high frequency is greater than or equal to 1 MHz.

15. The improvement according to claim 10, wherein each said heat treatment is applied in one of a non-oxidizing atmosphere and a vacuum.

16. The improvement according to claim 10, wherein the temperature of said final heat treatment is the same as the temperature of said previous heat treatment.

17. The improvement according to claim 10, wherein prior to said final heat treatment, a step of cooling to room temperature is performed.

18. The improvement according to claim 10, wherein said final heat treatment is performed immediately following said previous heat treatment.

* * * * *